(12) United States Patent
Scott

(10) Patent No.: US 7,594,786 B2
(45) Date of Patent: Sep. 29, 2009

(54) LOAD BINDER

(75) Inventor: Gary M. Scott, Milwaukie, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 539 days.

(21) Appl. No.: 11/532,057

(22) Filed: Sep. 14, 2006

(65) Prior Publication Data
US 2008/0069658 A1    Mar. 20, 2008

(51) Int. Cl.
B60P 7/08    (2006.01)
(52) U.S. Cl. .................. 410/100; 410/34; 410/35; 410/97
(58) Field of Classification Search .................. 410/34, 410/35, 96, 97, 100; 24/265 CD, 298, 302; 248/499
See application file for complete search history.

(56) References Cited

U.S. PATENT DOCUMENTS 5,980,173 A * 11/1999 Danekas et al. ............... 410/99

FOREIGN PATENT DOCUMENTS

DE    202 09 231 U1    9/2002

\* cited by examiner

*Primary Examiner*—Stephen Gordon
(74) *Attorney, Agent, or Firm*—Schwabe, Williamson & Wyatt

(57) ABSTRACT

A load binder including a clamp mechanism for clamping onto container members such side boards of a shipping container. The clamp mechanism includes arms having connecting members adapted to couple to a binding strap, as well as gripping members and a gripping pad adapted to clamp against the container member in response to an urging of connecting members towards one another. The arms and the gripping pad may be pivotal about a common axis. Further enhanced binding action may be achieved via a cam buckle provided with double lining.

9 Claims, 4 Drawing Sheets

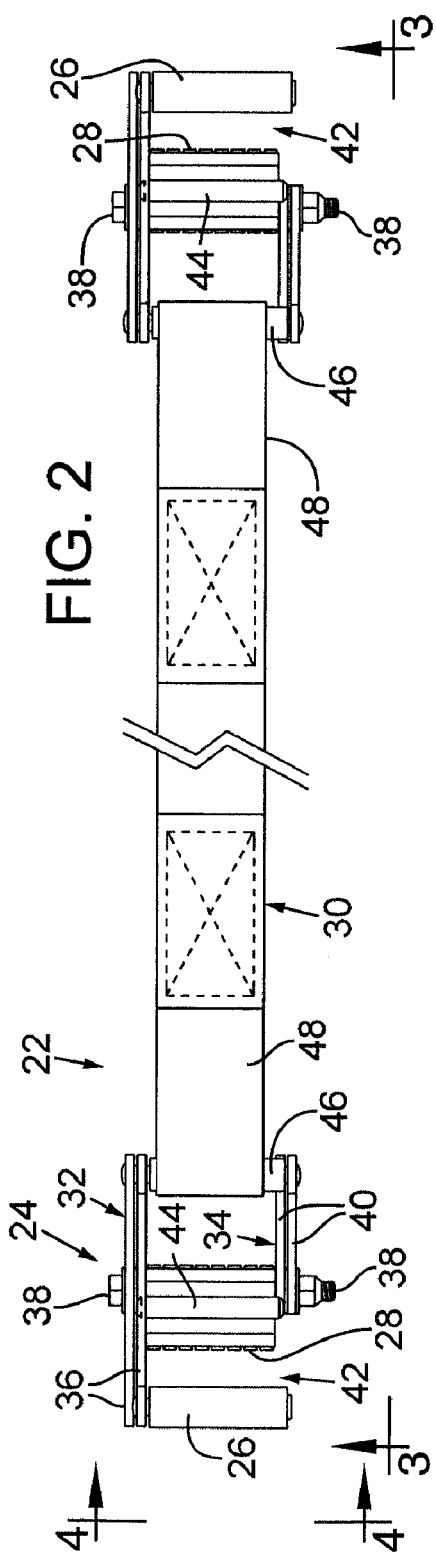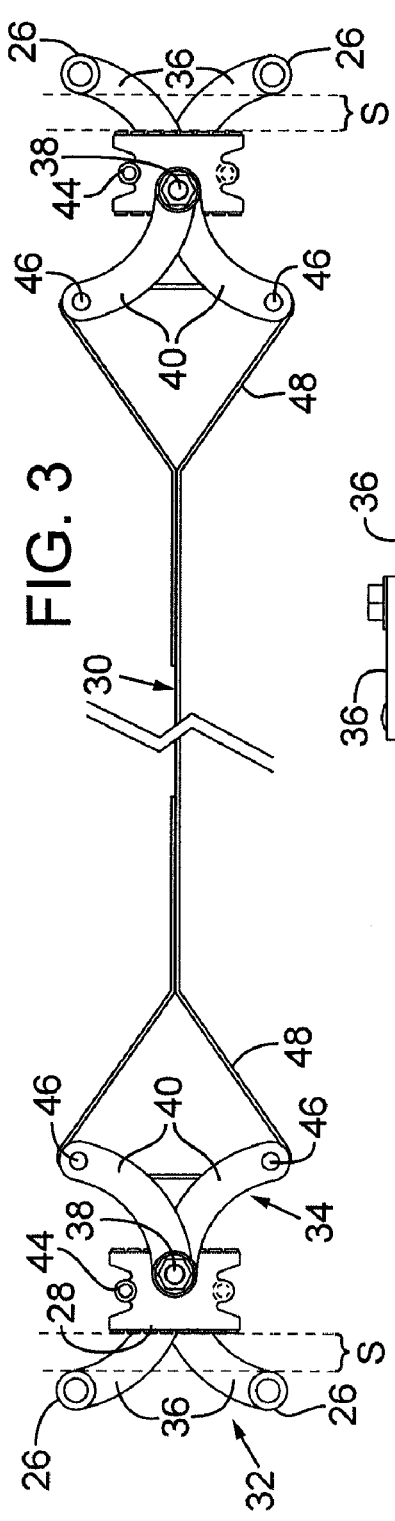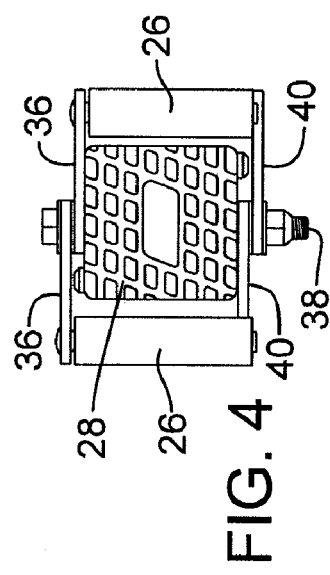

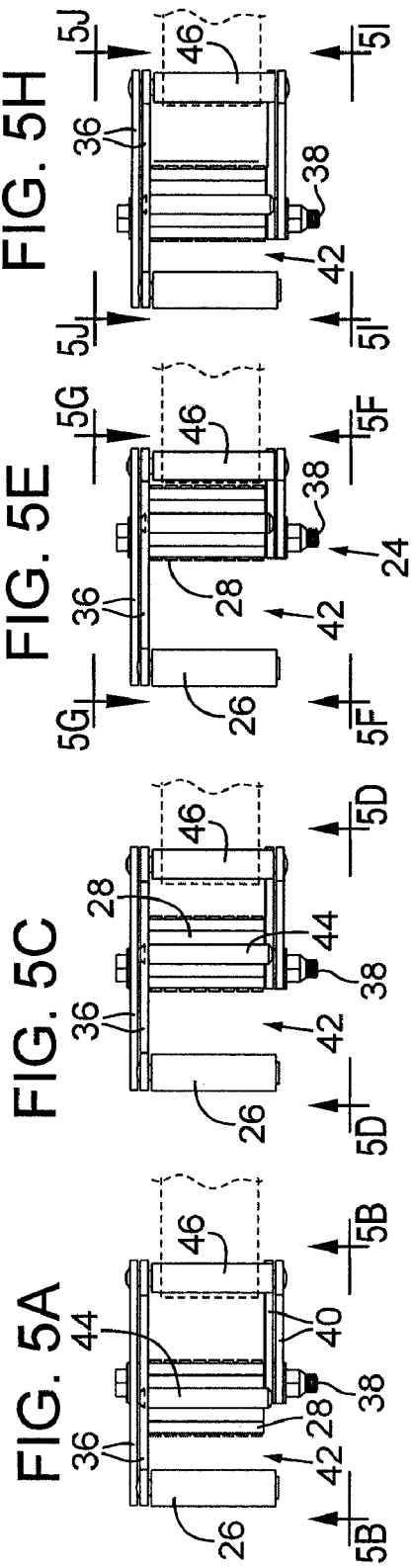

LOAD BINDER

FIELD OF INVENTION

The present invention relates to a load binder for securing a load in a container used to transport goods between locations. Such containers may include truck boxes, railroad cars, cargo ships and the like. More specifically it relates to the latches or clamps used to position and secure a load retaining strap extended between side rails of a container.

BACKGROUND OF THE INVENTION

Two primary concerns of the design of a load binder include the time it takes for a worker(s) to apply and secure a load binder in place in the container, and the achieved securement of the load binder for prevention of load shifting, which may result in damage to the goods being shipped.

A common load binder is a strap-type binder device having clamp members at each end. A cinch mechanism between the ends is released to allow sufficient strap length between the container sidewalls and enable engagement of the clamp members to the side boards or rails of opposing container walls. The cinch mechanism draws the strap tightly and in doing so produces clamping of the clamp members to the side boards. Sufficient cinching of the strap produces a clamping action to prevent slippage of the clamp members relative to the side rails of the container and thereby to secure the load against shifting.

A current clamp member has a pair of S shaped rods. Each rod is configured to have a center segment that is pivotally secured in side by side relation. Arm segments of each rod extend angularly and oppositely from the center segments in a manner whereby closing of the arm segments at one side of the pivotal connection (the inner side) produces opening of the arm segments at the other side of the pivotal connection (the outer side). Depending gripping posts formed at the outer arm ends move closer and further away from the pivotal center to provide gripping of a container rail.

Whereas the clamping mechanism as described above does produce a clamping action, that clamping or gripping action is not always adequate and there is a need to provide a clamp mechanism with enhanced gripping. As the gripping or clamping action is provided by tightening (linear cinching) of the cinch strap, the linear or cinching force induces pivoting together of the arm segments at the inner end. However the force vector that produces such pivoting diminishes as the arm segments are pivotally closed and the strap can reach a fully tightened condition prior to achieving a desired clamping action to the side boards. The present invention addresses and achieves the desired enhanced clamping action.

BRIEF DESCRIPTION OF THE INVENTION

In various embodiments of the present invention, improvements to the above current clamp may include replacing the dual center pivots for the arms with a single pivot, which can greatly enhance the gripping potential of the board clamp. A pair of opposing upper arms (oppositely angled or curved) may be commonly pivoted intermediate the arm ends to a common center pivot. Depending gripping members may be provided at generally outer ends of an outer side, and strap-receiving members are provided at the outer ends of an inner side of opposing upper arms of the clamp. The common pivot increases the effective clamping force vector created by the linear pull when cinching or tightening of the strap takes place.

In various embodiments, a rotatably adjustable clamping pad may be provided. The clamping pad may be rotatably carried by the pivot or pivot shaft, and a pad surface may be provided on both sides of the pad such that the pad may rotate about the pivot shaft. The center of rotation of the pad about the pivot may be offset such that the pad surface on one side has a linear spacing relative to the gripping or clamping members greater than the other side (when reversibly rotated on the pivot shaft). Thus with the gripping members pivoted to a closed position, the spacing between the posts and gripping pad will receive one size or thickness of container side board or rail, and with the gripping pad rotated to the other side, a lesser or greater thickness size of container side board may be accommodated.

As described, the applied force of the cinching action diminishes as the gripping posts separate (the inner posts become closed or closer together). In various embodiments, the reversible gripping pad may allow the gripping action to commence earlier in the pivoting action to enhance securement of the clamps to the rails. These and other improvements will be appreciated upon reference to the following detailed description and accompanying drawings.

BRIEF DESCRIPTION OF THE DRAWINGS

FIG. 2 is an enlarged view of the load binder only of FIG. 1;

FIG. 3 is a bottom view of the load binder as seen from view lines 3-3 of FIG. 2;

FIG. 4 is a view as taken on view lines 4-4 of FIG. 2;

FIGS. 5A and 5B illustrates a clamp member only from side and bottom views respectively;

FIGS. 5C and 5D are similar to FIGS. 5A and 5B but with the clamping pads reversed i.e. for clamping a greater rail thickness;

FIGS. 5E, 5F, and 5G are side, bottom, and top views respectively of the clamp members as shown in FIG. 5C but with the clamp member in a full open (non-clamping) condition;

FIGS. 5H, 5I, and 5J are side, bottom, and top views of the clamp members but showing the clamp members in a closed or clamping condition.

DETAILED DESCRIPTION OF EMBODIMENTS OF THE INVENTION

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
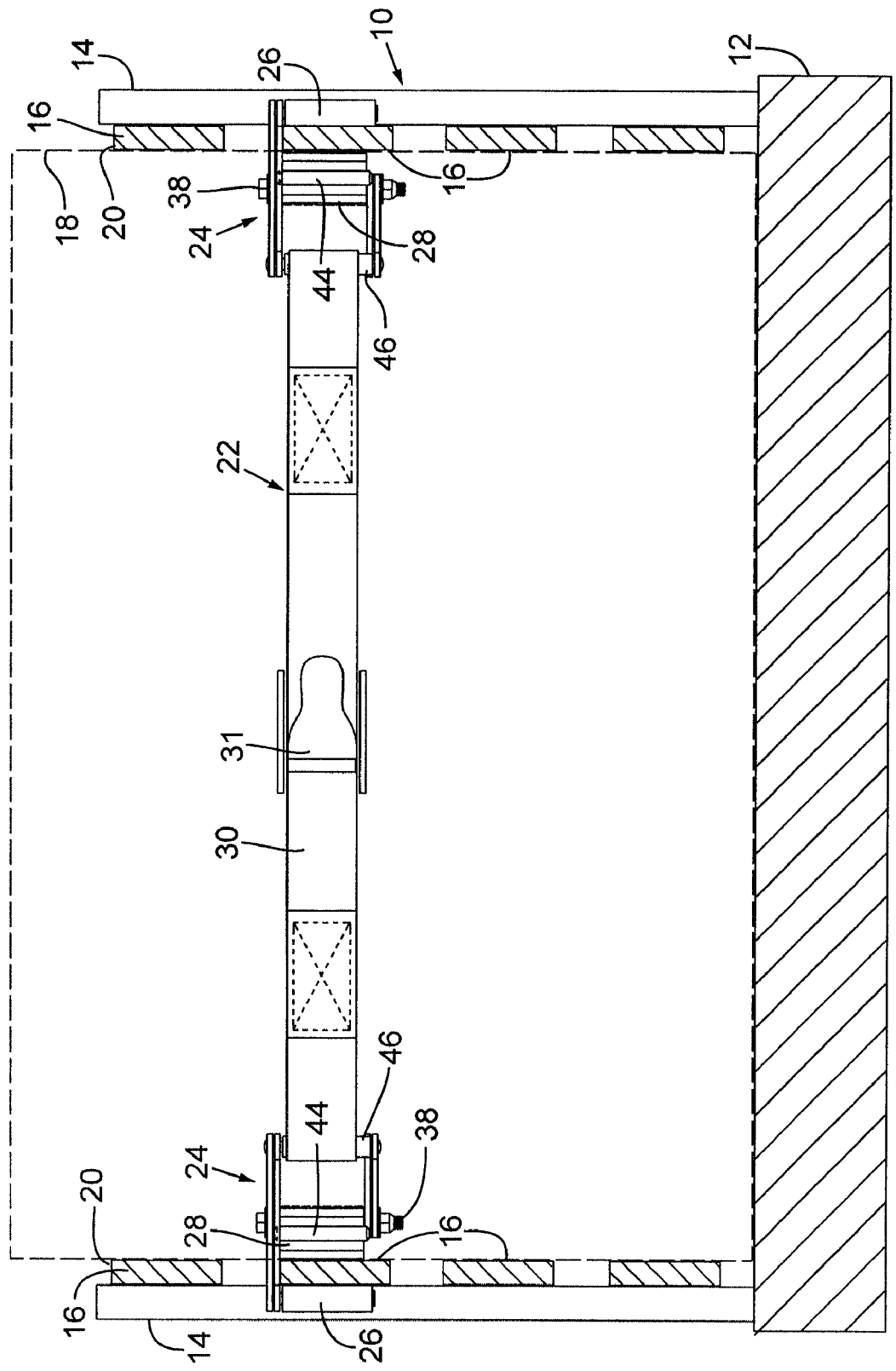
FIG. 1 illustrates a back to front section view of a container and a load binder of the strap variety incorporating the present invention, and as shown, securing a load in the container.

FIG. 1 illustrates perspective view of a board clamp in accordance with embodiments of the present invention. A container 10 having a floor or bed 12, may include for example spaced apart vertical side stanchions 14 having side boards or rails 16 coupled thereto. A load contained in the container is indicated by dash lines 18 (it is to be understood that container 10 can take any of numerous shapes, constructions and sizes as consistent with cargo hauling or transportation e.g. by land, sea, or rail (trucks, ships, or railroad cars)). A common feature for each, is the presence of opposing side rails such as will provide an exposed edge over which one or more clamp members 24 can be applied as illustrated in FIG. 1

Whereas the various features will be further explained with reference to FIGS. 2-5, as shown in FIG. 1, in one embodiment a load binder 22 includes a clamp member 24 at generally each end of the load binder and a strap 30 generally spanning the load-receiving width of the container 10. The clamp members may include sleeved or unsleeved gripping members 26 and gripping pads 28 that have been clamped onto the opposing rails 16 by tightening of the strap 30. Such tightening may be accomplished by any one of a variety of known cinching member 31.

FIG. 2 illustrates a load binder 22 as illustrated in FIG. 1 but without the features of a container 10 or the cinching member 31. In various embodiments, clamp member 24 may include an upper arm assembly 32 and a lower arm assembly 34. The upper arm assembly 32 includes overlapable upper arms 36 pivotally connected to pivot 38 intermediate its ends (see also FIGS. 5G and 5J). The lower arm assembly 34 may include overlapable arms 40 which may generally pivot about pivot 38 (see also FIGS. 5F and 5I). In various embodiments, some or all of the upper arms may be curved in nature relative to the pivot, as shown and described below, which may help in allowing for a more full range of motion and ability to avoid other components. In various embodiments, however, the upper arms may have generally straight portions extending from the pivot to each end, or a mixture of straight and curved portions. In various embodiments, the lower arms may also be curved as well as generally straight.

The gripping members 26 depend generally from the outer ends of upper arms 36, and together with gripping pad 28 define entry 42 e.g. for mounting to a rail or board 16 as shown in FIG. 1. The inboard end of the clamp member 24 may include connecting members 46 that are disposed between the inboard ends of the paired upper and lower arms 36 and 40 as seen in FIG. 2. Strap 30 may include an end loop portion 48 that encircles the connecting members 46 at each end of the load binder 22.

Reference is now made to FIGS. 5A, 5B, 5C, and 5D. Note that upper and lower arms 36 and 40 are similarly positioned in these figures. However, as compared to FIGS. 5A and 5B, the offset pad 28 in FIGS. 5C and 5D is rotated around pin 38 to place the thicker portion of the pad away from gripping members 26. This positioning may increase the entry 42 provided between the gripping members 26 and pad 28. Again, as explained herein, such reversal of the pad 28 enhances the ability of the clamp members to accommodate different thicknesses of boards or rails 20 (see FIG. 1).

In one embodiment, pads 28 may include pivot resist members 44. Pivot resist members 44 may include a protruding elastomeric knob that resists rotative movement of the pads 28 relative to the arms 36 and 40 and/or pivot 38. However, as desired by the installer, the knobs can be depressed or otherwise overcome to force rotation to the alternate positions i.e. as between FIGS. 5A and 5C.

Installation of the load binder 22 as illustrated in FIG. 1 will now be explained in accordance with various embodiments. The installer may first determine a desirable rotative positioning of the gripping pads 28. For example, the different sizes for entry 42 may be engineered to best accommodate the thicknesses of a 1" board or rail 16 versus a 2" board or rail 16. For a 1" board the entry 42 is desirably more closed with the pad 28 in a position similar to that shown in FIG. 5A and FIG. 5B. For a 2" rail or board 16, for example, the setting of the pad 28 may be adjusted to widen the entry 42, similar to that illustrated in FIGS. 5C and 5D.

FIGS. 5E, 5F, and 5G (side, bottom, and top views) illustrate the boars/rail receiving position for the clamp member 24 in accordance with various embodiments of the present invention. As will be noted, the gripping members 26 are generally close to each other whereas the connecting members 46 and are generally more spaced apart. In this position the sleeved gripping members may be at or generally near the maximum spacing from pad 28. See spacing $S_1$ in FIG. 5F.

FIGS. 5H, 5I, and 5J (side, bottom and top views) illustrate a more full clamping position of the clamp member 24 in accordance with various embodiments. By virtue of the somewhat C-shaped configuration of the upper arms and the abbreviated C-shape of the lower arms, as the cinch strap is tightened, the connecting members will be brought towards each other while the gripping members are urged away from each other. Such movement may tend to cause a clamping of the board/rail between the gripping members and the pad. For example, note space $S_2$ in FIG. 5I, as compared to space $S_1$ of FIG. 5F.

Whereas the greater and lesser spacings S are illustrated for but one configuration of rotative gripping pad 28, it will be understood that the pad 28 can be reversed to similarly accommodate a different size board or rail, e.g. 1" instead of 2" thickness. In order to maximize the clamping force, it will be appreciated that it may be desirable to have the board size more closely fit the larger and/or maximum opening of spacing S whereby a smaller closure from the full opened position will achieve clamping to a board/rail 16.

Reference is now made to FIGS. 1 and 3. Note that FIG. 3 as compared to FIG. 5F illustrates the distance S in more of a closed configuration, which may be a clamped configuration depending on the thickness of the board/rail, connecting members 46 are more spaced apart. This relationship may be attributable in part to the relatively significant curvature provided to arms 36 (e.g. C-shaped), and may allow for the clamping action to increase as the clamping members 26 are further spaced apart. Further, such curvature may be considered a structural advantage, and thus allow for thinner materials to be used for the arms and still resist bending. In various embodiments, the clamping force increases as the connecting members are brought closer together by the loop 48 of the strap being tightened and/or pulled generally linearly away from the clamp. The inward force applied to the closure of connecting members 46 may tend to decrease as the connecting members get closer together.

The lateral or closing force as compared to prior clamp members is significantly improved and substantially enhances the gripping affect of the clamp member. Such improvement may be attributable to a variety of factors in accordance with embodiments of the invention, including, but not limited to the use of a single pivot, the greater curve of the arms 36, the adjustable pad 28, and/or the single loop 48 of the strap. In various embodiments, connecting members 46 may be adapted to rotate about a substantially vertical axis, or may have a rotating sleeve that may help avoid sliding friction and wear as the loop 48 is opened and closed. Such may reduce wear of the strap at the inside of loop 48 and thereby extend the life of the strap 30. In other embodiments, a lower friction material may be used for the connecting members and/or sleeves. In various embodiments, the gripping members may also be rotatable and/or sleeved to resist damage and wear with respect to the boards/rails.

Figure 8:
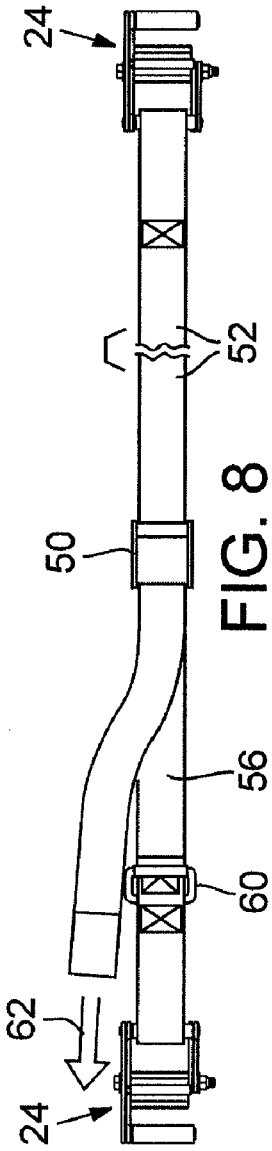
Figure 6:
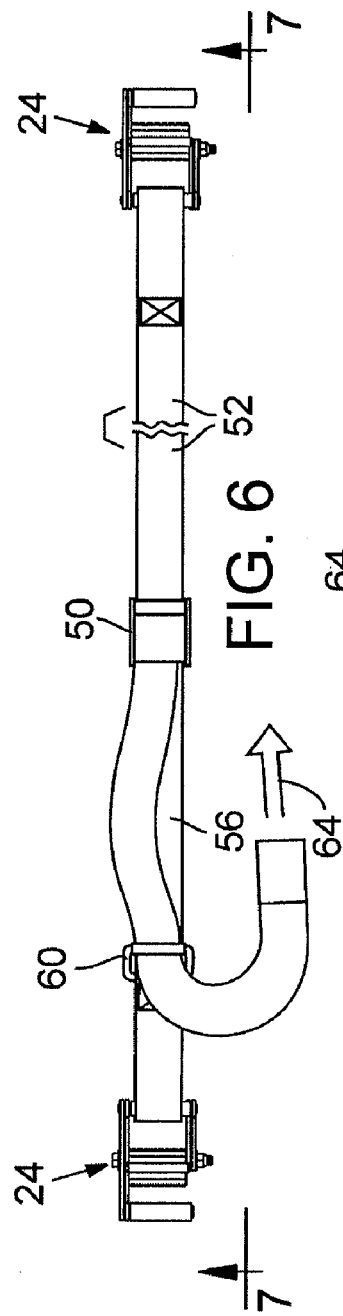
Figure 7:
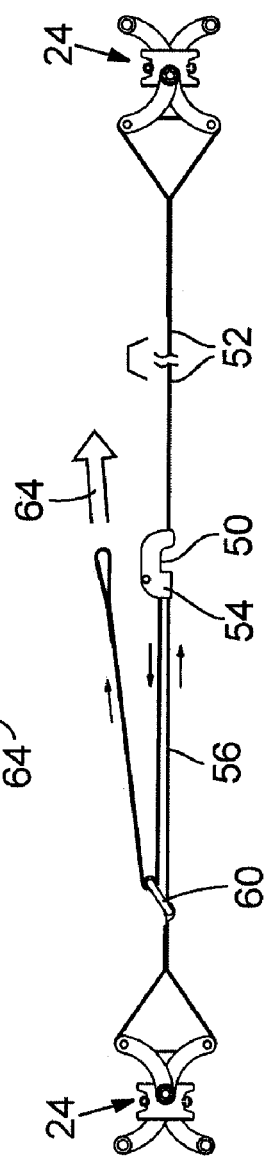

Whereas the improved clamp mechanism generates enhanced gripping of the side rails, in various embodiments, the need for the clamping force may be reduced. Reference is now made to FIGS. 6-8. The clamp mechanism or clamps 24 are illustrated but attached to a different type of cinching mechanism which may be referred to as a cam buckle 50. Typically a strap portion 52 is fixed to one end of the cam buckle and a one way releasable clutch indicated at 54 receives an opposing strap portion 56. This strap portion 56 is threaded through the buckle 50 and the free end of strap portion 56 is pulled through as indicated by arrow 62 in FIG. 8. In various embodiments, cam style web securing devices, ratchet web securing devices, over-center buckle web securing devices, or any other common webbing/strap securing device may be used with the board clamp and/or the secondary leverage enhancing device.

An improvement is provided for such load binder, in which various embodiments may include a reversing loop 60 secured to the strap portion 56. The strap portion 56 is first threaded through the buckle 50 and directed back onto itself to the reversing loop 60 as illustrated in FIG. 6. As indicated by arrows 64 in FIGS. 6 and 7, the strap portion may thus be reversed a second time and a cinching force is applied in the opposite direction to that of 62. Such may be referred to as double lining and can provides the installer with additional leverage i.e. a two inch pull of the strap end as double lined will produce substantially 1" of strap pulled through buckle 50 i.e. a 2 to 1 ratio of leverage and a substantial improvement in the generation of a desired force for tightening the strap.

Figure 9B:
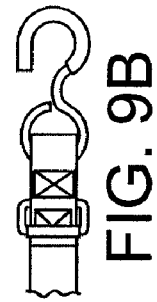
FIGS. 6, 7, 8, 9A and 9B illustrate an improved cinching configuration.
Figure 9A:
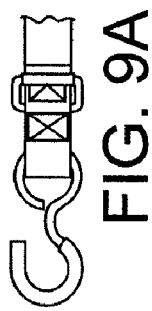

Whereas FIGS. 6, 7, and 8 illustrate a clamp mechanism as described for FIGS. 1-5, it will be appreciated that the double lining provided for buckle 50 via loop 60 may be applied to other forms of said gripping mechanism as illustrated in FIGS. 9A and 9B.

As previously indicated there are multiple features which are believed independently and/or collectively unique including the common pivot axis of the multiple arms around the axis of pivot 38, the adjustability of spacing S due to the rotatability of pad 26, the single loop 48 applying the inward directed force on the connecting members 46, the reduced friction connecting members 46, and/or the greater curvature of the arms providing a more robust clamp with less material. It is anticipated that the function of these features may be achieved with numerous modifications and variations of the indicated features in the manner of application e.g. in combination and individually. In accordance with this recognition, the claims appended hereto are intended to be interpreted in their broadest sense as will be recognized by persons skilled in the art.

What is claimed is:

1. A container member clamp, comprising:
   a pair of arms pivotal about a common axis, each having an opposite curvature and/or straight portions, the arms having an outboard portion and an inboard portion;
   gripping members coupled to the outboard portions that are adapted to engage an edge and/or back side of a container member;
   a gripping pad rotatably disposed about said axis and adapted to engage a front side of the container member,
   connecting members coupled to the inboard portions, the connecting members adapted for engagement with a binding strap, wherein application of a force on the binding strap directed away from the clamp urges the connecting members towards one another,
   which results in application of a clamping force on the container member caused by the gripping members becoming closer to the gripping pad.

2. The container member clamp of claim 1, wherein the gripping pad is offset with respect to the axis such that the gripping pad can have a first position and a second position relative to the gripping members, the first position having a greater distance between the gripping members in an open configuration.

3. The container member clamp of claim 2, wherein the gripping pad is resistively rotatable about the axis.

4. The container member clamp of claim 1, wherein the arms include:
   upper arms that are curved between an outer end of the outboard portion and an inner end of the inboard portion; and
   a pair of lower arms disposed on an opposite side of the gripping pad from the upper arm, the lower arms having oppositely curved inboard portions that generally correspond to curvature of the inboard portion of the upper arms, the lower arms each having a first end pivotal about the axis and a second end coupled to a corresponding connecting member.

5. The container member clamp of claim 1, wherein the binding strap is provided with a single end loop that engages both of the connecting members, wherein the force directed away from the clamp urges elongation of the loop and thus causes rotative closure of the inboard portions of the arms.

6. The container member clamp of claim 5, wherein the connecting members are rotatably coupled to the inboard portions of the arms to help avoid sliding movement of the end loop relative to the connecting members.

7. The container member clamp of claim 1, wherein the arms are generally C-shaped and have a consistent radius of curvature.

8. The container member clamp of claim 1, wherein the gripping members and/or the connecting members are sleeved to enhance gripping and/or reduce wear.

9. The container member clamp of claim 1, wherein said binding strap includes a reversing loop that allows the strap to be double lined to increase leverage and thus the force directed away from the clamp.

* * * * *

UNITED STATES PATENT AND TRADEMARK OFFICE
CERTIFICATE OF CORRECTION

| | | |
|---|---|---|
| PATENT NO. | : 7,594,786 B2 | Page 1 of 1 |
| APPLICATION NO. | : 11/532057 | |
| DATED | : September 29, 2009 | |
| INVENTOR(S) | : Gary M. Scott | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this

Twenty-eighth Day of September, 2010

David J. Kappos
*Director of the United States Patent and Trademark Office*